(12) United States Patent
Nitta et al.

(10) Patent No.: US 9,678,857 B1
(45) Date of Patent: Jun. 13, 2017

(54) LISTING OPTIMAL MACHINE INSTANCES

(71) Applicant: International Business Machines Corporation, Armonk, NY (US)

(72) Inventors: Keisuke Nitta, Koshigaya (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/953,669

(22) Filed: Nov. 30, 2015

(51) Int. Cl.
*G06F 9/44* (2006.01)
*G06F 11/36* (2006.01)
*G06F 9/455* (2006.01)
*G06F 17/30* (2006.01)

(52) U.S. Cl.
CPC ...... *G06F 11/3664* (2013.01); *G06F 9/45516* (2013.01); *G06F 11/3656* (2013.01); *G06F 17/3053* (2013.01); *G06F 17/30601* (2013.01); *G06F 8/10* (2013.01); *G06F 8/20* (2013.01); *G06F 8/24* (2013.01)

(58) Field of Classification Search
CPC ..... G06F 8/10; G06F 8/20; G06F 8/24; G06F 11/3664; G06F 11/3688; G06F 11/323
See application file for complete search history.

(56) References Cited

U.S. PATENT DOCUMENTS

| | | | |
|---|---|---|---|
| 8,700,532 B2 | 4/2014 | Nakae et al. | |
| 9,069,737 B1 * | 6/2015 | Kimotho | G06F 11/1484 |
| 9,098,214 B1 * | 8/2015 | Vincent | G06F 9/4856 |
| 9,250,863 B1 * | 2/2016 | Vincent | G06F 9/45558 |
| 9,286,182 B2 * | 3/2016 | Fries | G06F 11/301 |

(Continued)

FOREIGN PATENT DOCUMENTS

| | | |
|---|---|---|
| JP | 2005331895 A | 12/2005 |
| WO | 2008146639 A1 | 12/2008 |

OTHER PUBLICATIONS

Roytman et al., "PACMan: Performance Aware Virtual Machine Consolidation", USENIX Association, Jun. 2013, ICAC'13, pp. 83-94; <https://www.usenix.org/system/files/conference/icac13/icac13_roytman.pdf>.*

(Continued)

*Primary Examiner* — Thuy Dao
*Assistant Examiner* — Ben C Wang
(74) *Attorney, Agent, or Firm* — Reza Sarbakhsh

(57) ABSTRACT

A method for listing optimal machine instances in a computing environment based on user context is provided. The method includes receiving a task request based on a first task to be performed within the computing environment, identifying one or more similar tasks by comparing metadata for the first task to metadata for a plurality of other tasks based on a classification analysis, selecting the one or more similar tasks based on a result from the classification analysis exceeding a predetermined confidence level, and generating a list of one or more previous machine instances corresponding to the one or more similar tasks. The list of previous machine instances is associated with instructions to commence the previous machine instances. The plurality of other tasks include previous tasks performed within the computing environment on corresponding previous machine instances. The machine instances may include a virtual machine (VM) instance or a physical machine instance.

17 Claims, 9 Drawing Sheets

(56) References Cited

U.S. PATENT DOCUMENTS

| | | | | |
|---|---|---|---|---|
| 9,400,675 | B1* | 7/2016 | DeLuca | G06F 9/45558 |
| 2004/0044643 | A1* | 3/2004 | deVries | G06F 9/45558 |
| 2009/0300641 | A1* | 12/2009 | Friedman | H04L 67/1097 |
| | | | | 718/104 |
| 2012/0323853 | A1* | 12/2012 | Fries | G06F 11/301 |
| | | | | 707/649 |
| 2013/0238785 | A1* | 9/2013 | Hawk | G06F 9/5072 |
| | | | | 709/224 |
| 2013/0318599 | A1* | 11/2013 | Fadida | G06F 21/31 |
| | | | | 726/21 |
| 2014/0123136 | A1* | 5/2014 | Beda, III | G06F 9/45558 |
| | | | | 718/1 |
| 2014/0146055 | A1* | 5/2014 | Bala | G06F 11/1402 |
| | | | | 345/501 |
| 2014/0149591 | A1* | 5/2014 | Bhattacharya | H04L 67/1097 |
| | | | | 709/226 |
| 2014/0149695 | A1* | 5/2014 | Zaslavsky | G06F 12/16 |
| | | | | 711/162 |
| 2014/0258238 | A1* | 9/2014 | Jin | G06F 9/45558 |
| | | | | 707/649 |
| 2014/0298337 | A1 | 10/2014 | Anderson et al. | |
| 2015/0040127 | A1* | 2/2015 | Dippenaar | G06F 9/4856 |
| | | | | 718/1 |

OTHER PUBLICATIONS

Kakadia et al., "Network-aware Virtual Machine Consolidation for Large Data Centers", ACM, Nov. 2013, NDM'13, pp. 1-8; <http://dl.acm.org/citation.cfm?id=2534702&CFID=896972060&CFTOKEN=52547286>.*

Netto et al., "Software Bundling Selection for Cloud Virtual Machine Images", IEEE, May 2013, IFIP'13, pp. 575-581; <http://ieeexplore.ieee.org/stamp/stamp.jsp?tp=&arnumber=6573035>.*

Rajasekaran et al, http://www.grin.com/en/e-book/295645/user-preference-based-environment, "User Preference Based Environment Provisioning in Cloud", (2015), 11 pages.

Mell et al., "The NIST Definition of Cloud Computing", National Institute of Standards and Technology, Special Publication 800-145, Sep. 2011, pp. 1-7.

* cited by examiner

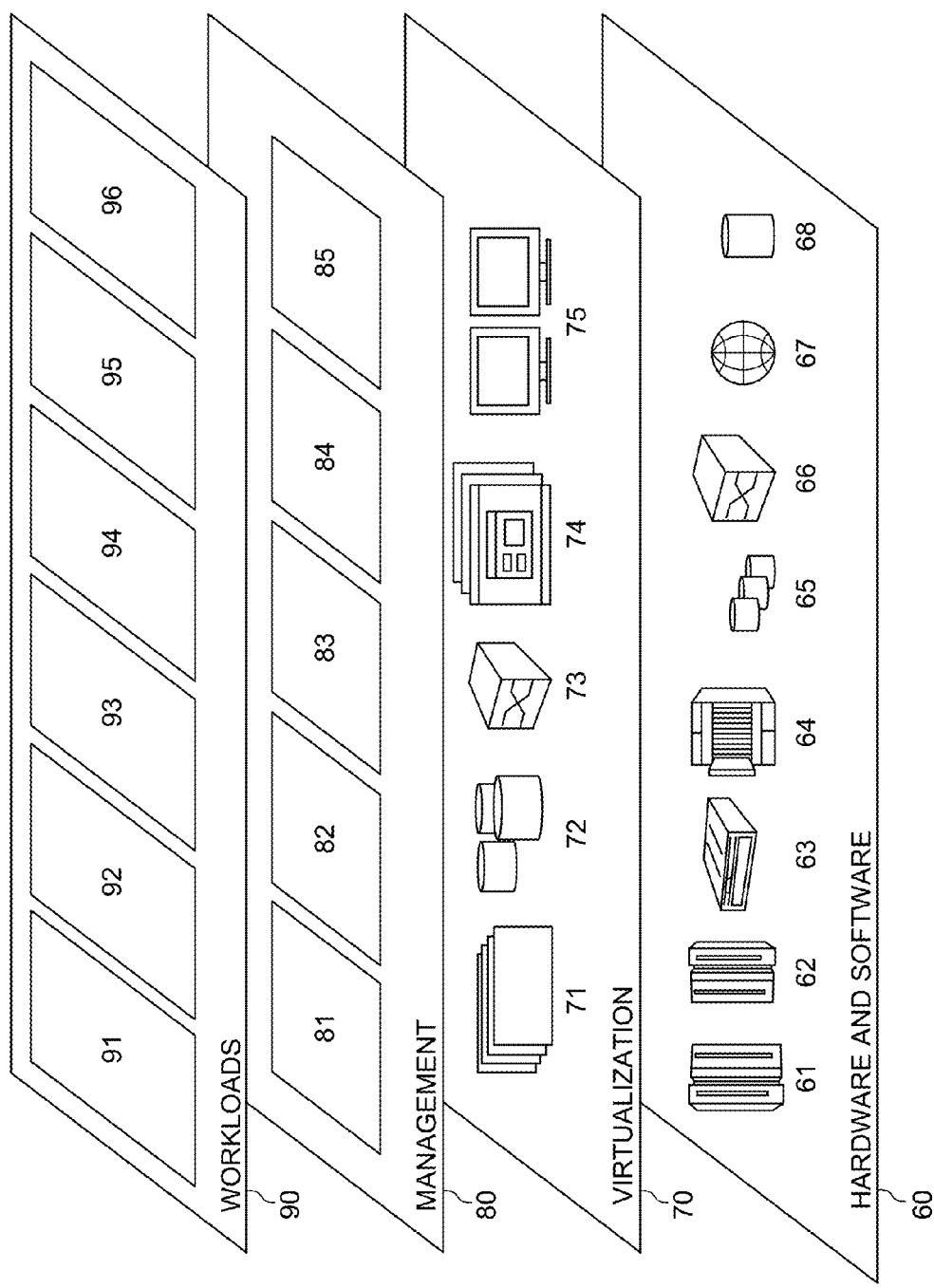

LISTING OPTIMAL MACHINE INSTANCES

BACKGROUND

The present invention generally relates to machine instances, and more particularly to listing optimal machine instances in a computing environment based on user context.

Software may be developed in a computing environment, such as a cloud computing environment, where virtual environments or virtual machine (VM) instances may be created and utilized in testing the software at various stages of development, and the VM instances may be adapted to various combinations of different operating systems (OS), middleware, and middleware parameters. In some cases, the number of VM instances may be difficult to track an optimal VM instance for a given project task associated with the operation and/or development of the software, and unnecessary man-hours may be expended on finding the optimal VM instance for the task or in the re-creation of a VM instance (that may be duplicative of an earlier used VM instance).

For example, in the domain of error analysis, numerous VM instances with minor differences from each other (e.g., vis-à-vis middleware versions and parameters) may be generated and may be managed. Certain naming conventions may allow a user to identify a VM instance or group of VM instances that may be suitable for a particular task. The naming convention, for example, may resemble: "owner (administrator)|OS|hostname|purpose|installed software, etc." However, naming conventions may not be accurate due to a variety of reasons stemming from human error during the naming process for the VM instance including occurrence of a sudden event preventing the creation of a new VM instance and forcing diversion of an existing VM machine for another purpose, an internet protocol (IP) address may be diverted because other IP addresses may be unavailable, and compliance of the naming convention may be ignored, e.g., because of a time constraint. In other cases, the naming convention may contain insufficient information to identify the optimal VM instance. Still, searching a list of VM instance names may be time consuming and inefficient or may nonetheless introduce human errors during the search of the list itself, e.g., by overlooking or misreading VM instance names.

SUMMARY

According to one embodiment, a method for listing optimal machine instances in a computing environment based on user context is provided. The method may include receiving a task request based on a first task to be performed within the computing environment, identifying one or more similar tasks from a plurality of other tasks by comparing metadata for the first task to metadata for the plurality of other tasks based on a classification analysis, selecting the one or more similar tasks, and generating a list of one or more previous machine instances corresponding to the one or more similar tasks. Similarity of the one or more similar tasks to the first task is based on a result from the classification analysis exceeding a predetermined confidence level. The list of previous machine instances is associated with instructions to commence the previous machine instances. The plurality of other tasks include previous tasks performed within the computing environment on corresponding previous machine instances. The machine instances may include a virtual machine (VM) instance or a physical machine instance.

According to another embodiment, a computer program product for listing optimal machine instances in a computing environment based on user context is provided is provided. The computer program product may include at least one computer readable non-transitory storage medium having computer readable program instructions for execution by a processor. The computer readable program instructions include instructions for receiving a task request based on a first task to be performed within the computing environment, identifying one or more similar tasks by comparing metadata for the first task to metadata for a plurality of other tasks based on a classification analysis, selecting the one or more similar tasks based on a result from the classification analysis exceeding a predetermined confidence level, and generating a list of one or more previous machine instances corresponding to the one or more similar tasks.

According to another embodiment, a computer system for listing optimal machine instances in a computing environment based on user context is provided is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions include instructions for receiving a task request based on a first task to be performed within the computing environment, identifying one or more similar tasks by comparing metadata for the first task to metadata for a plurality of other tasks based on a classification analysis, selecting the one or more similar tasks based on a result from the classification analysis exceeding a predetermined confidence level, and generating a list of one or more previous machine instances corresponding to the one or more similar tasks.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which:

FIG. 9 depicts abstraction model layers according to an embodiment of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Various embodiments of the present invention will now be discussed with reference to FIGS. 1-9, like numerals being used for like and corresponding parts of the various drawings.

According to one embodiment, provided is a method for providing a user interface for selecting a machine instance (e.g., a VM instance) to perform a first task within a computer environment by receiving a task request based on the first task, identifying one or more similar tasks from a plurality of other tasks by comparing metadata for the first task to metadata for the plurality of other tasks based on a classification analysis, selecting the one or more similar tasks, and displaying a list of one or more previous VM instances corresponding to the one or more similar tasks.

The method, computer program products, and systems disclosed herein may decrease the amount of time to select (or generate) a machine instance suitable for a particular project task. Identifying machine instances associated with tasks similar to a task to be performed may decrease the time required to select a suitable (or optimal) machine instance for the task to be performed. Similarity or sameness of the other tasks known to a particular computing environment may be performed based on a classification analysis, e.g., by a cognitive computing system. By analyzing the first task (to be performed) a machine instance selection system (as contemplated herein) may identify similar tasks (or previous performance of the same task) and display the machine instances associated with those tasks. The user may select the machine instance most appropriate for the task to be performed.

Figure 1:
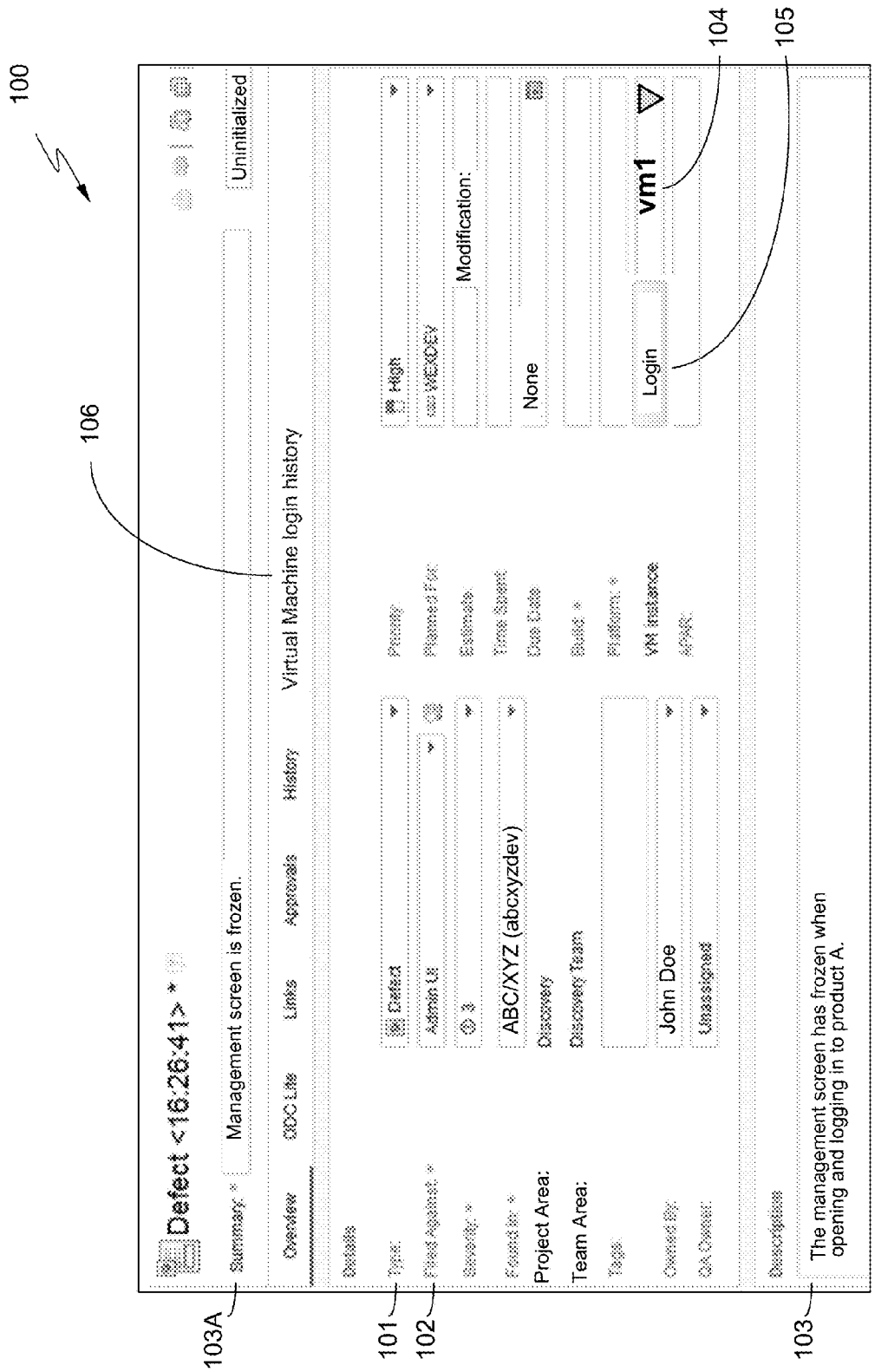
FIG. 1 illustrates an exemplary user interface for selecting a machine instance, according to an embodiment.

FIG. 1 illustrates an exemplary user interface 100 for selecting a machine instance (e.g., a VM instance), according to an embodiment. User interface 100 may be provided as part of a task management system, e.g., for managing project tasks in a computer environment, such as a work breakdown structure (WBS), a bug tracking system (BTS), and the like. User interface 100 may be associated with performing a project task (e.g., a first task), such as preparing a response to a problem management request (PMR), e.g., received from a software customer.

User interface 100 may include user input areas associated with a generalized categorization for a first task (e.g., type dropdown menu 101), an affected software (e.g., filed against dropdown menu 102), a description of the first task (e.g., description text field 103), a summary of the first task (e.g., summary field 103A), a listing of optimal VM instances (e.g., VM instance dropdown menu 104), and an interface object associated with initiating instructions to commence a VM instance, e.g., selected from the listing of optimal VM instances (e.g., VM instance log-in button 105). User interface 100 may also provide a VM instance use history, e.g., via a VM instance use history button 106. It will be appreciated that user interface 100 may also include, but is not limited to, other information and user input areas associated with administrator, user, and customer information, severity of problem, project and team information, due date(s), operating system(s), platform(s), software build(s), and other information and user inputs known or contemplated in the project task management field.

It will be appreciated that the description of the first task (e.g., provided in description text field 103) may provide additional detail for the first task and may provide a detailed, nuanced understanding of the task (e.g., beyond a generalized, categorical tag such as a task "type," e.g., as provided in type dropdown menu 101). The description of the first task (e.g., via the description text field 103) may be provided as natural language text, e.g., as unstructured data, that may convey information including, but not limited to, a purpose of the task, a problem the task is meant to address, specific details associated with the task, etc. The information contained in the description of the first task (e.g., metadata for the first task) may be analyzed (e.g., via natural language processing, parsed, subjected to fact or information extraction, etc.) and compared against descriptions of other tasks (e.g., metadata for other tasks) known to the computing environment, i.e., the system providing user interface 100. In one embodiment, the metadata for the first task and other tasks may be analyzed with a cognitive computing solution (e.g., applying data mining algorithms, pattern recognition, speech/language recognition, probability analyses, machine-learning, etc.). The other tasks known to the system may be previously performed project tasks for the same or different user, and the same or different customer, and may be a previous performance of the same task, a similar task, or a dissimilar task.

In one embodiment, the task description (e.g., information contained in the description text field 103) may pertain to a problem that a customer is experiencing with respect to a supported software. The task description may be provided by the customer (e.g., via another user interface) or a user associated with receiving and processing the customer's problem query. In one embodiment, the task description may be prepopulated in user interface 100. In a further embodiment, the prepopulated task description may form a basis for a listing of the VM instances, e.g., in VM instance dropdown menu 104.

VM instance dropdown menu 104 (which is an exemplary form of a listing of optimal machine instances, e.g., VM instances) may include optimal VM instances selected from a plurality of other VM instances (e.g., VM instances previously used in the computing environment associated with user interface 100). As shown in FIG. 1, VM instance dropdown menu 104 is not activated. When activated (e.g., by clicking on, rolling over with a cursor, or otherwise selecting), VM instance dropdown menu 104 may provide a list of optimal VM instances for selection. The optimal VM instances may be associated with project tasks determined to be similar or the same as the first task (to be performed).

Entries in (activated) VM instance dropdown menu 104 (e.g., menu entries for individual VM instances) may be associated with instructions to commence the listed VM instance. For example, a user may select a VM instance from VM instance dropdown menu 104 and subsequently initiate the selected VM instance by activating (e.g., by clicking) a user interface object associated with initiating the selected VM instance.

VM instance log-in button 105 (which is an exemplary form of a user interface object associated with initiating instructions to commence a VM instance) may be associated with initiating instructions to commence the selected VM instance (e.g., selected from VM instance dropdown menu 104).

VM instance use history button 106 may provide a listing of previous uses of the selected VM instance. For example, if the selected VM instance was used in the past, the prior usage of the VM instance may be provided in a separate menu, listing, page, etc. The prior use history may include, but is not limited to, the task(s) performed on the VM instance and the date(s) the VM instance was used, the user(s) associated with the prior uses of the VM instance, etc.

In another embodiment, the user interface may include information (or selections) prepopulated (or preselected) in one or more information fields (or dropdown menus), e.g., type dropdown menu 101, filed against dropdown menu 102, description text field 103, summary field 103A, and VM instance dropdown menu 104. The prepopulated information (and preselected options) may be based on information received by another user interface or other data sources. In another further embodiment, a user may access the user interface (with one or more information fields prepopulated and/or options preselected) and a final step to initiating a VM instance (on which to perform the first task) may include selecting a VM instance from VM instance dropdown menu 104 and providing instructions to initiate the selected VM instance in the computing environment (e.g., via clicking the VM instance log-in button 105).

The dropdown menus depicted in FIG. 1 are exemplary, and it is contemplated that one or more of the information and user input associated with such dropdown menus may alternatively be provided via other forms of user input, such as other selection paradigms (e.g., radio buttons, check boxes, etc.) and text entry fields.

Figure 2:
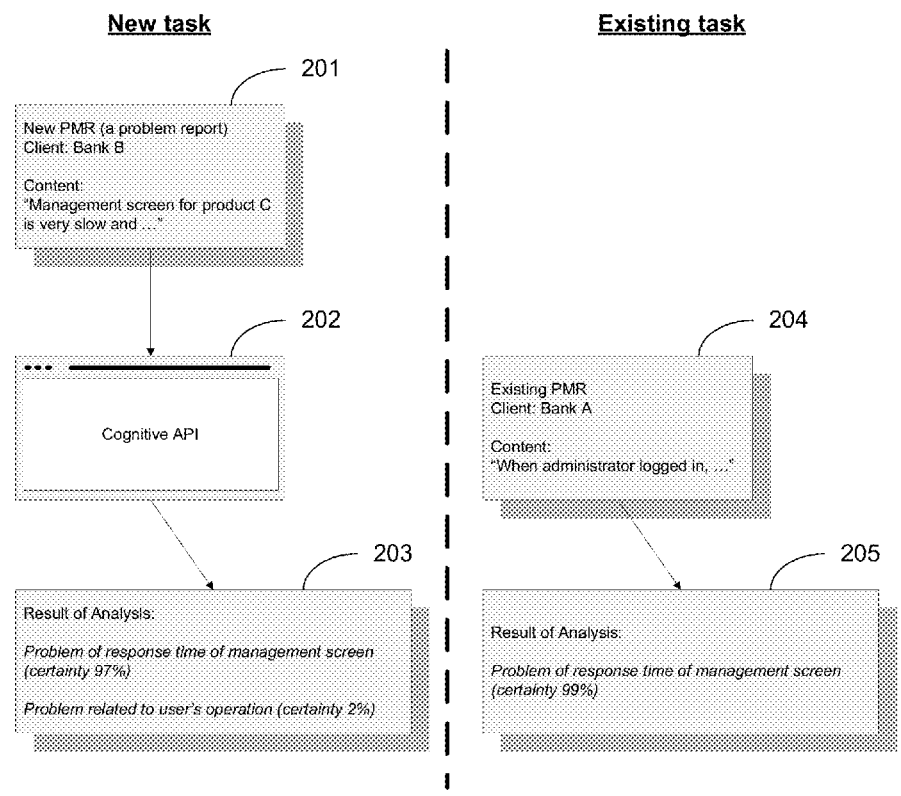
FIG. 2 is a block diagram illustrating a metadata analysis aspect of an exemplary method for listing optimal machine instances in a computing environment based on user context, according to an embodiment.

FIG. 2 depicts a block diagram illustrating a metadata analysis aspect of an exemplary method for listing optimal machine instances (e.g., VM instances) in a computing environment based on user context, according to an embodiment. Block 201 may be a new problem management request (PMR) that may form a basis for a first task (to be performed on a VM instance in a computing environment). The new PMR may be received by a task management system including an optimal VM instance selection system, as disclosed herein. The new PMR may be from a particular customer (e.g., Bank A) and may include a description of the problem (e.g., "Management screen for product C is very slow and . . . "). Information (e.g., metadata) for the new PMR may be transmitted to a cognitive computing system (e.g., a cognitive API 202) for an analysis of the problem (and the first task to be performed based on the problem).

The analysis performed by the cognitive computing system may include analyzing the metadata for the new PMR (e.g., the problem description), extracting information (e.g., by applying natural language processing, fact/information extraction, etc.), matching the extracted information to categories of information known to the optimal VM instance selection system, and providing categories of known information ordered by magnitude of certainty, e.g., in the form of results 203.

Results 203 may include categories of known information determined to be matches for the metadata for the new PMR. For example, results 203 may include at least two categories of information (e.g., "Problem of response time of management screen" and "Problem related to user's operation"). The categories of known information may be a summarization of a previous problem and/or task previously performed in the computing environment. It will be appreciated that the metadata associated with the new PMR (e.g., the content or description of the problem) may be presented in an unstructured format, e.g., using natural language (e.g., "Management screen for product C is very slow and . . . "), and the results of the cognitive analysis may provide normalized or categorized metadata recognized by the cognitive computing system (and the optimal VM instance selection system).

Results 203 may further include a magnitude of certainty that the provided category of known information is a match to the metadata for the new PMR (e.g., 97% and 2% certainty, as depicted in FIG. 2, respectively).

Results 203 may represent an aspect of a first analysis of a first task, i.e., determining the primary objective(s) of the first task. Blocks 204 and 205 may represent aspects of a second analysis of the first task, i.e., determining previous tasks that share the primary objective(s) of the first task.

Block 204 may be a previous (existing) PMR, which may form the basis for a previous task (performed on a corresponding VM instance in the computing environment). For example, the previous PMR may be from another customer (e.g., Bank A) and metadata for the previous PMR may include a description of the previous problem (e.g., "When administrator logged, in . . . ").

Previous results 205 may include categories of known information matched to the metadata for the previous PMR. For example, previous results 205 may include a category of information (e.g., "Problem of response time of management screen") and may also include a magnitude of certainty that the provided category of known information is a match to the previous PMR (e.g., 99% certainty). In one embodiment, a new PMR (e.g., a first task) may be considered to share the same problem as an existing PMR (e.g., a previous task) based on the new PMR and the existing PMR being matched to the same problem by a certainty level above a predetermined level. For example, new PMR (associated with block 201) may be considered to share the same problem as an existing PMR (associated with block 204) because the new PMR and the existing PMR are both matched to the same category (e.g., "Problem of response time of management screen") with analysis certainties of 97% and 99%, respectively.

In one embodiment, VM instances associated with tasks that have been sorted (e.g., matched, determined, etc.) as being associated with the same problem (or problems of the same kind) may be selected as candidate VM instances and may be provided in order of certainty (e.g., analysis certainty that the same problem is associated with a particular task).

Figure 3:
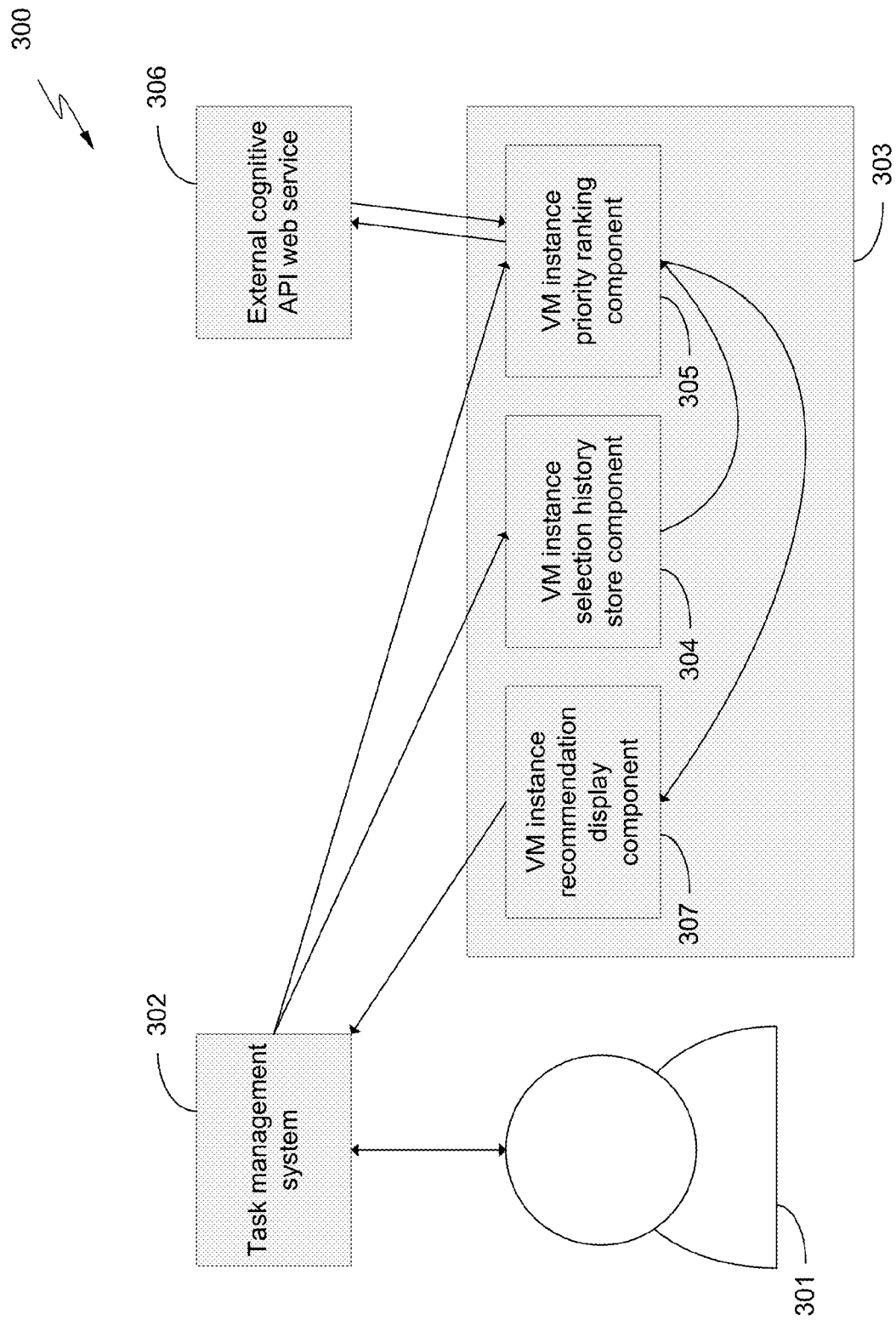
FIG. 3 is a block diagram illustrating an exemplary system employing an exemplary method for listing optimal machine instances in a computing environment based on user context, according to an embodiment.

FIG. 3 depicts a block diagram illustrating an exemplary system 300 employing an exemplary method for listing optimal machine instances (e.g., VM instances) in a computing environment based on user context, according to an embodiment. User 301 may access task management system 302 via one or more user interfaces. Task management system 302 may manage project tasks associated with a computer environment, e.g., tasks for modifying and/or developing software in the computer environment. Task management system 302 may be provided as part of a VM instance management tool, e.g., a VM instance administration console, etc.

A user interface for selecting a VM instance (e.g., user interface 100, depicted in FIG. 1) may be provided through one of the user interfaces associated with task management system 302. The user interface for selecting a VM instance (e.g., user interface 100) may provide an interface for VM instance selection system 303.

VM instance selection system 303 may include one or more components (e.g., program modules) such as, VM instance selection history store component 304, VM instance priority ranking component 305, and VM instance recommendation display component 307.

VM instance selection history store component 304 may store metadata associated with VM instances previously used by the user. The metadata may be provided by one or more additional components associated with the task management system.

VM instance priority ranking component 305 may gather metadata associated with a task (e.g., a first task) to be performed by the user. The metadata may be provided by one or more additional components associated with the task management system. In one embodiment, the metadata may be associated with information provided via one of the user interfaces associated with task management system, such as a user interface for selecting a VM instance (e.g., user interface 100, depicted in FIG. 1).

VM instance priority ranking component 305 may transmit metadata associated with the first task (and VM instances previously used by the user) to a cognitive computing system 306. The metadata may be transmitted to cognitive computing system 306, e.g., in the form an external API call.

Cognitive computing system 306 may analyze and compare the metadata for the first task to metadata for similar, previous tasks based on cognitive computing analyses, e.g., by applying natural language processing, fact/information extraction, matching and probability analyses, etc. Cognitive computing system 306 may identify one or more similar tasks (i.e., similar to the first task) by matching the metadata for the first task with metadata for one or more similar tasks based on a cognitive computing analysis and ordered by a level of certainty, e.g., confidence level. The metadata for the one or more similar tasks may include metadata associated with corresponding VM instances associated with the one or more similar tasks.

Results from cognitive computing system 306 may be transmitted to VM instance selection system 303, and in particular, may be transmitted to VM instance priority ranking component 305. VM instance priority ranking component 305 may consider results from cognitive computing system 306 and VM instances previously used by the user, e.g., from VM instance selection history store component 304, in determining a priority ranking for VM instances associated with the one or more similar tasks and VM instances previously used by the user. VM instance priority ranking component 305 may select one or more similar tasks (i.e., task(s) similar to the first task) based on a result from a classification analysis (e.g., performed by cognitive computing system 306) exceeding a predetermined confidence level, and metadata for the similar task(s) includes metadata for a corresponding VM instance.

Results from VM instance priority ranking component 305 (e.g., including a priority ranking for VM instances associated with the one or more similar tasks and VM instances previously used by the user) may be provided to VM instance recommendation display component 307.

VM instance recommendation display component 307 may display a list of one or more previous VM instances (e.g., associated with one or more similar tasks). The list of one or more previous VM instances may be ordered based on a ranking provided by VM instance priority ranking component 305, and may be provided, e.g., in a dropdown menu as part of a user interface associated with task management system 302 (such as user interface 100, depicted in FIG. 1).

Figure 4:
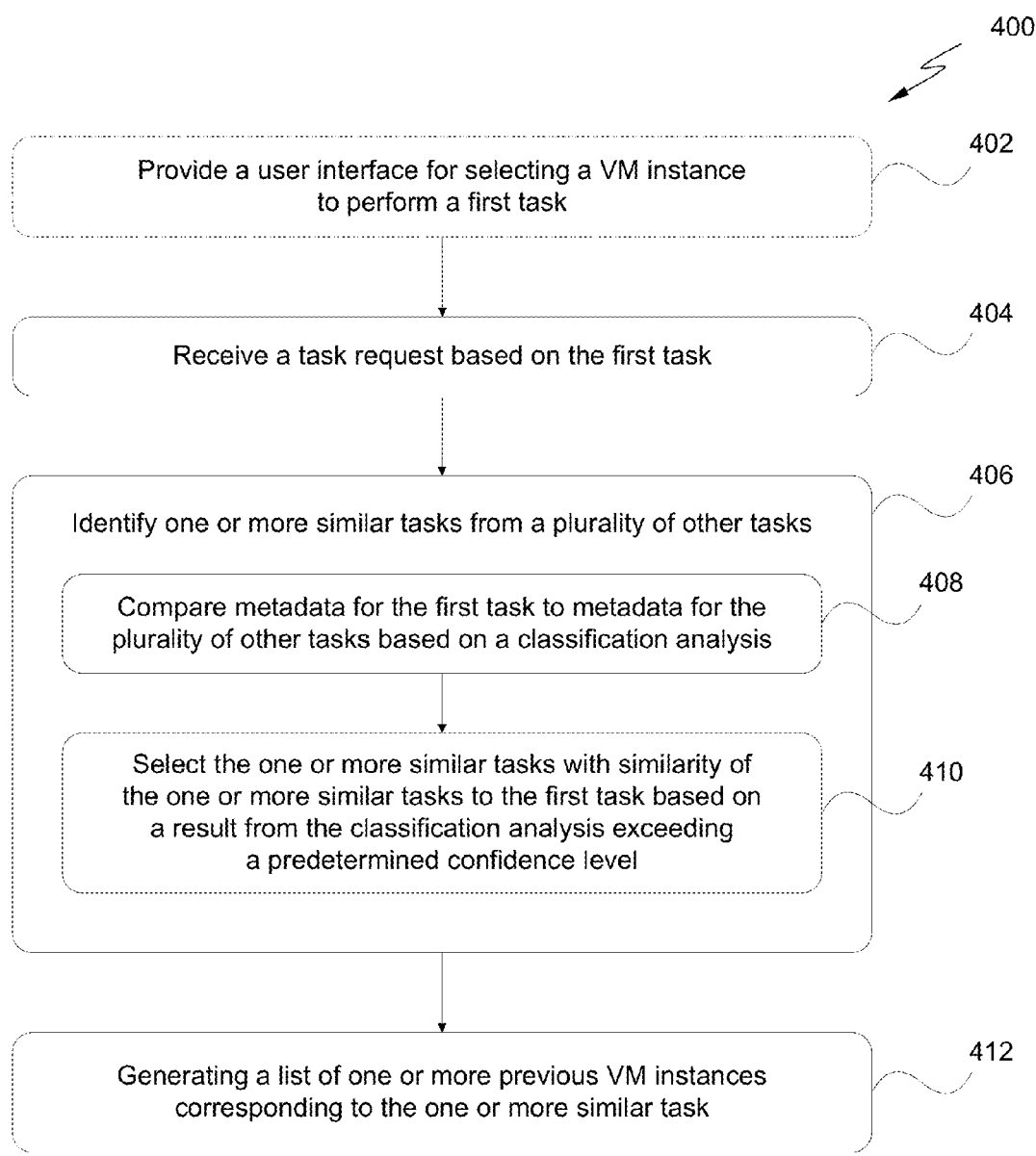
FIG. 4 is a flowchart illustrating an exemplary method for listing optimal machine instances in a computing environment based on user context, according to an embodiment.

FIG. 4 illustrates a first flowchart 400 depicting an exemplary method for listing optimal machine instances (e.g., VM instances) in a computing environment based on user context, according to an embodiment. At 402, a user interface may optionally be provided for selecting a VM instance to perform a first task (e.g., in a computing environment). The user interface may be user interface 100, depicted in FIG. 1.

At 404, a task request may be received based on the first task. The task request may be provided through the user interface or may be provided through another user interface. For example, the task request may be received by a preliminary user interface that may generate a PMR and associated communications, e.g., to a task management system, which may include a VM instance selection system. The task request may include metadata for the first task including, but not limited to, a description of the first task (which may include unstructured data, such as natural language text entries), a user associated with the first task (e.g., a user to perform the first task and to select a VM instance), and a customer associated with the first task (e.g., a customer associated with a PMR or problem request forming the basis for the first task). In one embodiment, the method may begin with receiving a task request based on a first task to be performed within the computing environment.

At 406, one or more similar tasks (i.e., one or more tasks similar to the first task) may be identified from a plurality of other tasks. The plurality of other tasks may include previous tasks performed within the computing environment, and the other tasks may have been performed on a corresponding VM instance. Identifying the one or more similar tasks may include the following sub-processes.

At sub-process 408, metadata for the first task may be compared to metadata for the plurality of other tasks based on a classification analysis. Determining similarity between the one or more similar tasks and the first task may be based on a classification analysis, which may utilize existing technologies for classifying similar tasks based on metadata and the descriptions of the tasks, e.g., cognitive computing analyses, natural language processing, fact/information extraction, matching and probability analyses, classification using machine-learning technology, other machine-learning techniques.

At sub-process 410, one or more similar tasks may be selected based on a result from the classification analysis exceeding a predetermined confidence level.

At 412, a list of one or more previous VM instances corresponding to the one or more identified similar tasks may be generated. The list of VM instances may be associated with instructions to commence the one or more VM instances, e.g., in response to a selection and a user instruction to start a selected VM instance. In one embodiment, the list of one or more previous VM instances may be displayed, e.g., in a user-interface.

Figures 5A, 5B:
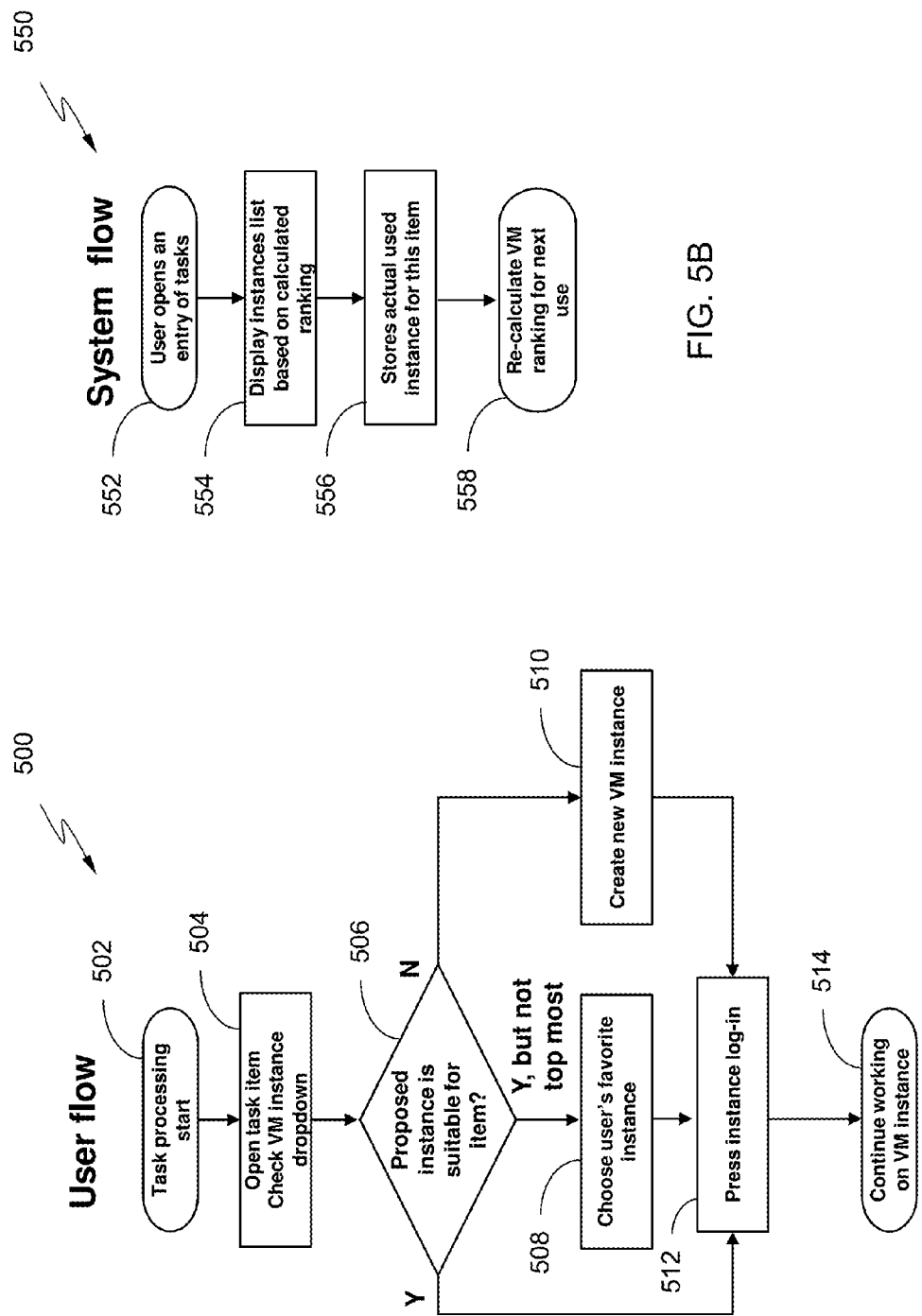
FIG. 5A is a flowchart illustrating an aspect from a user's perspective of an exemplary method for listing optimal machine instances in a computing environment based on user context, according to an embodiment.
FIG. 5B is a flowchart illustrating an aspect from an exemplary system perspective of an exemplary method for listing optimal machine instances in a computing environment based on user context, according to an embodiment.

FIG. 5A illustrates a second flowchart 500 depicting an aspect from a user's perspective of an exemplary method for listing optimal machine instances (e.g., VM instances) in a computing environment based on user context, according to an embodiment.

At 502, a user may start a task process (e.g., based on a first task). At 504, the user may open a task item and an associated user interface including a VM instance list (e.g., listing one or more optimal VM instances based on the first task). The VM instance list may be provided as a dropdown menu in the associated user interface. The VM instance list may include a top-listed or highest-ranked VM instance, e.g., a first-listed VM instance on a dropdown menu. Such VM instance may be considered a proposed VM instance.

At decision 506, the user may evaluate the proposed VM instance for the first task. If the proposed VM instance may be suitable for the first task, the user may select the proposed VM instance, and, at 512, the user may activate a user interface object (e.g., a log-in button) to send instructions, e.g., to a task management system or VM instance administration console, to start the proposed VM instance.

However, if the proposed VM instance is not the user's preferred VM instance, at 508, the user may evaluate the VM instance list and select another VM instance from the list, and, at 512, the user may activate the log-in button to send instructions to start the selected VM instance.

Further, if the VM instance list does not list a suitable VM instance for the first task, at 510, the user may create a new VM instance, and, at 512, the user may activate the log-in button to send instructions to start the new VM instance.

At 514, the user may continue processing the task item (e.g., the first task) on the proposed, selected, or new VM instance.

FIG. 5B illustrates a third flowchart 550 depicting an aspect from an exemplary system perspective of an exemplary method for listing optimal machine instances (e.g., VM instances) in a computing environment based on user context, according to an embodiment.

At 552, an entry of tasks (e.g., including a first task) may be opened in response to a user input. At 554, a list of VM instances may be displayed based on a calculated ranking of VM instances corresponding to similar, previous tasks (e.g., similar to the first task). At 556, the actual VM instance selected or created may be stored and associated with the performance of the first task. At 558, the calculated ranking of VM instances may be updated with the actual VM instance, and may be used in a subsequent opening of another entry of tasks.

Figure 6:
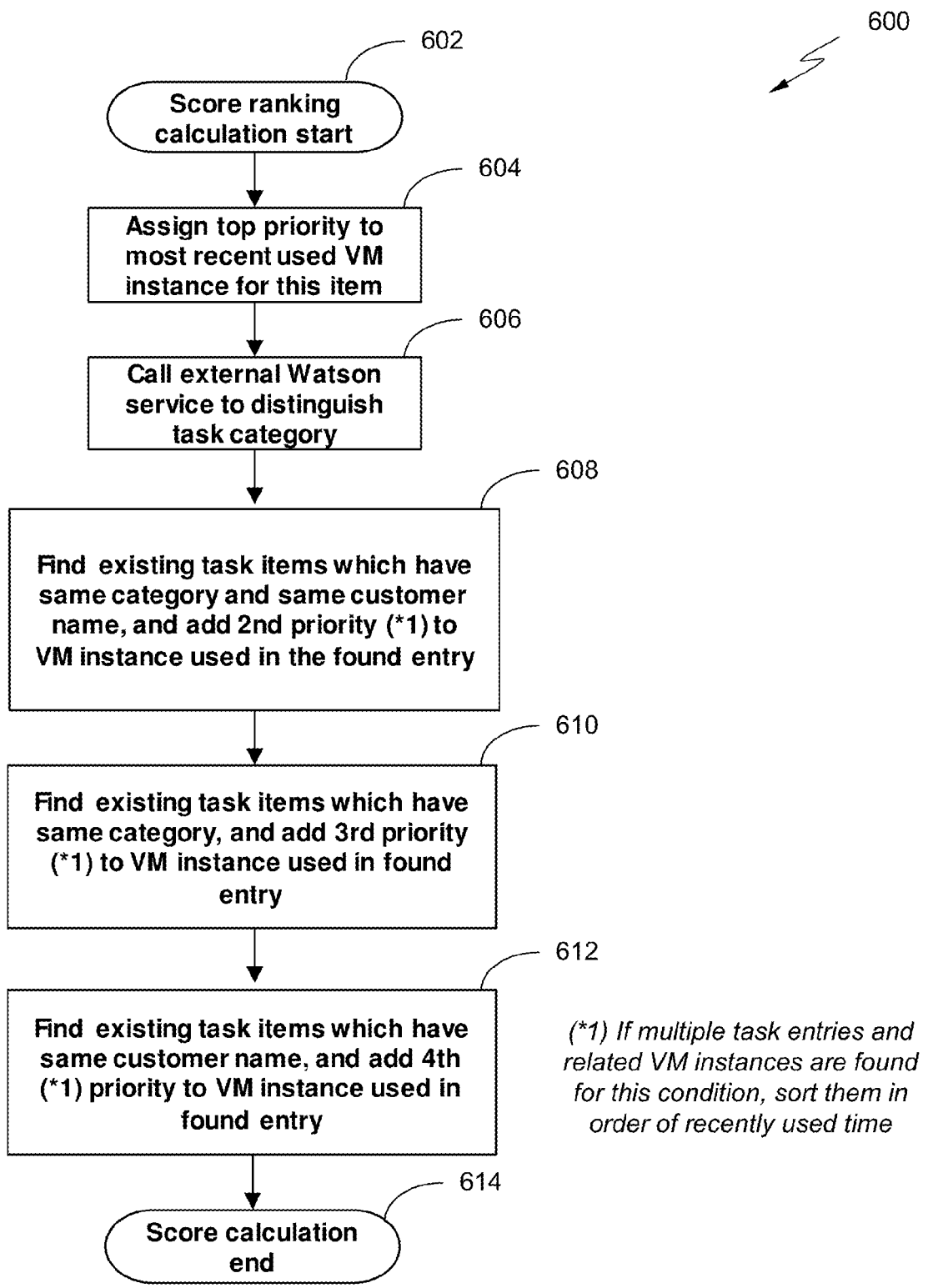
FIG. 6 is a flowchart illustrating another aspect of an exemplary method for listing optimal machine instances in a computing environment based on user context, according to an embodiment.

FIG. 6 illustrates a fourth flowchart 600 depicting another aspect of an exemplary method for listing optimal machine instances (e.g., VM instances) in a computing environment based on user context, according to an embodiment. It will be appreciated that the foregoing exemplary aspect depicts a method of ranking previous VM instances using certain metadata and specific ranking priorities; however, any other metadata and/or other ranking priorities may be used to rank the previous machine instances, e.g., depending on a user's requirements.

At 602, a process to rank previous VM instances may commence. The previous VM instances may be identified from a plurality of tasks that have been determined to be similar to a task to be performed by a user (e.g., a first task).

At 604, a top priority may be assigned to a most recently used VM instance used by the user (e.g., with respect to the task to be performed). At 606, an API call to an external cognitive computing service may be transmitted, which may request categorization and matching of the first task to other previous tasks. At 608, other previous tasks may be identified that share a category and customer name associated with the first task. VM instances associated with such tasks may be assigned a second highest priority. Multiple VM instances sharing a category and customer name associated with the first task may be sorted in order of most recently used VM instances.

At 610, other previous tasks may be identified that share a category (but not a customer name) associated with the first task. VM instances associated with such tasks may be assigned a third highest priority. Multiple VM instances sharing a category (but not a customer name) associated with the first task may be sorted in order of most recently used VM instances.

At 612, other previous tasks may be identified that share a customer name (but not a category) associated with the first task. VM instances associated with such tasks may be assigned a fourth highest priority. Multiple VM instances sharing a customer name (but not a category) associated with the first task may be sorted in order of most recently used VM instances.

At 614, the process to rank the previous VM instances may end. The ranked VM instances may be provided to one or more components in a VM instance selection system or task management system, e.g., for display in a user interface for selection by the user.

In one embodiment, the method further includes ranking the one or more previous machine instances, and generating the list of one or more previous machine instances includes listing the one or more previous machine instances based on the ranking.

In a further embodiment, the first task is associated with a first task category and a first customer name, and wherein ranking the one or more previous machine instances corresponding to the one or more similar tasks comprises assigning a priority ranking, wherein the priority ranking is selected from the group consisting of: a highest rank priority to a machine instance corresponding to a previous task performed by the user within the computing environment; a second highest rank priority to a machine instance corresponding to a similar task associated with the first task category and the first customer name; a third highest rank priority to a machine instance corresponding to a similar task associated with the first task category; and a fourth highest rank priority to a machine instance corresponding to a similar task associated with the first customer name.

In a further embodiment, the highest rank priority is assigned to a machine instance corresponding to a previous performance of the first task by the user within the computer environment.

In another further embodiment, the highest rank priority is assigned to a machine instance corresponding to a previous task most recently performed by the user within the computing environment.

In another further embodiment, a plurality of machine instances are assigned to a single priority ranking, and wherein the plurality of machine instances assigned to the single priority ranking are further ranked from a most recently used machine instance to a least recently used machine instance.

In one embodiment, the classification analysis is performed by a cognitive computing system. In one embodiment, the classification analysis includes at least one of natural language processing or machine-learning.

In a further embodiment, identifying the one or more similar tasks from the plurality of other tasks further includes transmitting an application programming interface (API) call to an external computing system, with the API call including metadata associated with the first task and the external computing system performs at least one of natural language processing or machine-learning, and receiving results from the external computing system including metadata associated with one or more candidate tasks sorted in order of certainty that the one or more candidate tasks is equivalent to the first task.

In one embodiment, the method may further include providing a user interface for selecting a machine instance on which to perform the first task within the computing environment, and the user interface includes a dropdown menu, and generating the list of one or more previous machine instances corresponding to the one or more similar tasks includes displaying the list in the dropdown menu. It will be appreciated that the list of one or more machine instances displayed in the dropdown menu may be ordered based on any ranking priority disclosed herein or contemplated, e.g., based on any metadata and/or other ranking priorities depending on a user's requirements.

In a further embodiment, the user interface further includes a user interface object associated with initiating instructions to commence a previous machine instance selected from the dropdown menu.

In a further embodiment, the dropdown menu further includes an option to create a new machine instance, and the user interface object is further associated with initiating instructions to commence the new machine instance. In one embodiment, the new machine instance may be a VM instance.

In one embodiment, the metadata for the plurality of other tasks is stored in a database, and the method further includes receiving instructions to commence a selected machine instance selected from the list of one or more previous machine instances, and storing updated metadata for the first task in the database, and the updated metadata includes metadata associated with the selected machine instance.

In another embodiment, the metadata for the plurality of other tasks is stored in a database, and the method further includes receiving instructions to commence the new machine instance, and storing updated metadata for the first task in the database, wherein the updated metadata includes metadata associated with the new machine instance.

In one embodiment, the computing environment is a cloud computing environment. In another embodiment, the computing environment may include one or more environments utilizing physical machines, e.g., physical machine instances.

In an alternative embodiment, a method for listing optimal machine instances may include receiving a task request associated with a first task, identifying one or more similar tasks from a plurality of other tasks and ranking one or more previous machine instances associated with the one or more similar tasks by assigning a top priority to a most recently used machine instance associated with a previous performance of the first task, assigning a second priority to one or more machine instances associated with one or more previous tasks sharing a task category and customer name with the first task, assigning a third priority to one or more machine instances associated with one or more previous tasks sharing a task category with the first task, and assigning a fourth priority to one or more machine instances associated with one or more previous tasks sharing a customer name with the first task.

Embodiments disclosed and contemplated herein may be implemented and performed on a computing node, e.g., disclosed herein.

Figure 7:
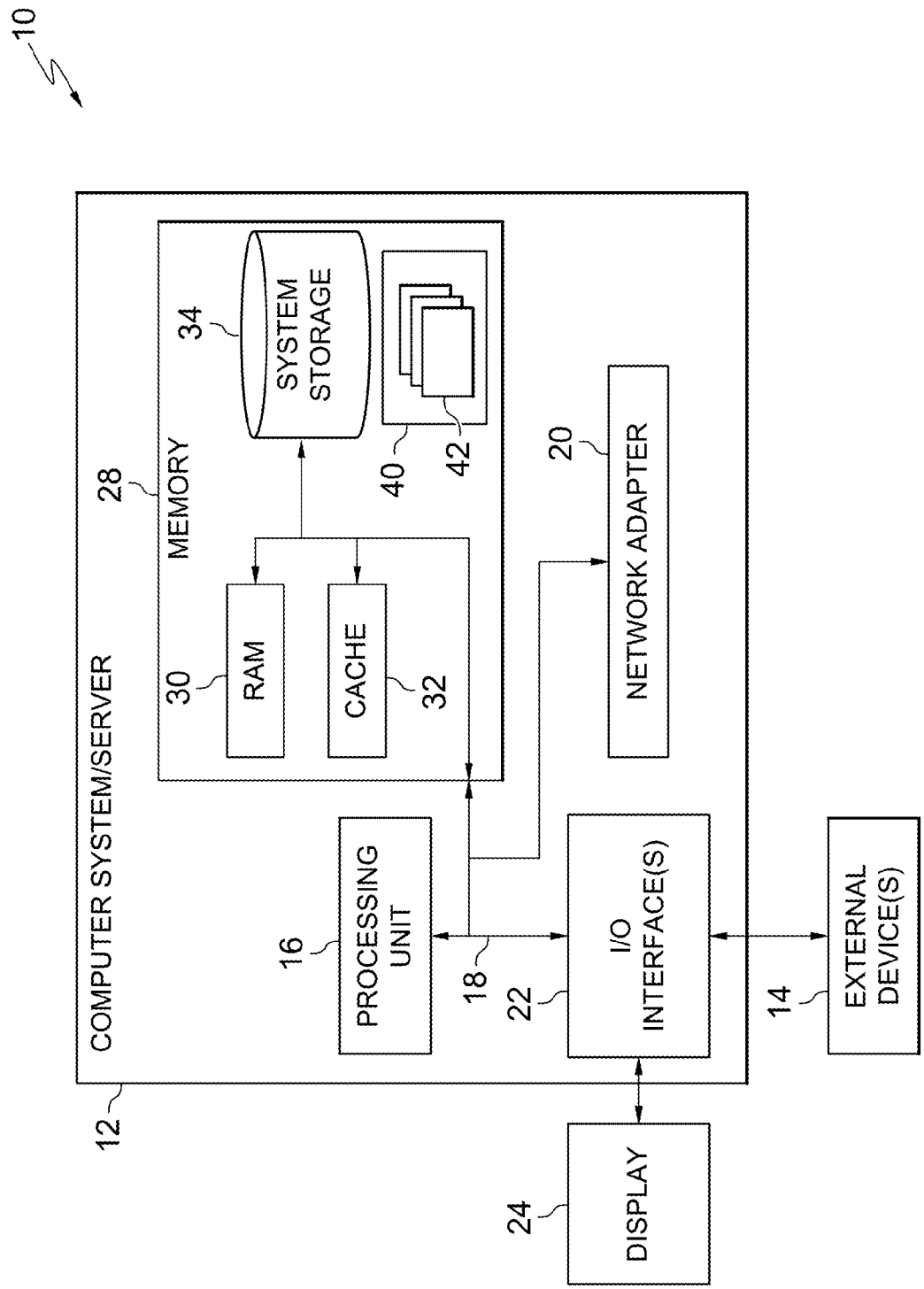
FIG. 7 is a block diagram illustrating a computing node, according to an aspect of the invention.

FIG. 7 depicts a schematic illustrating an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 7, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
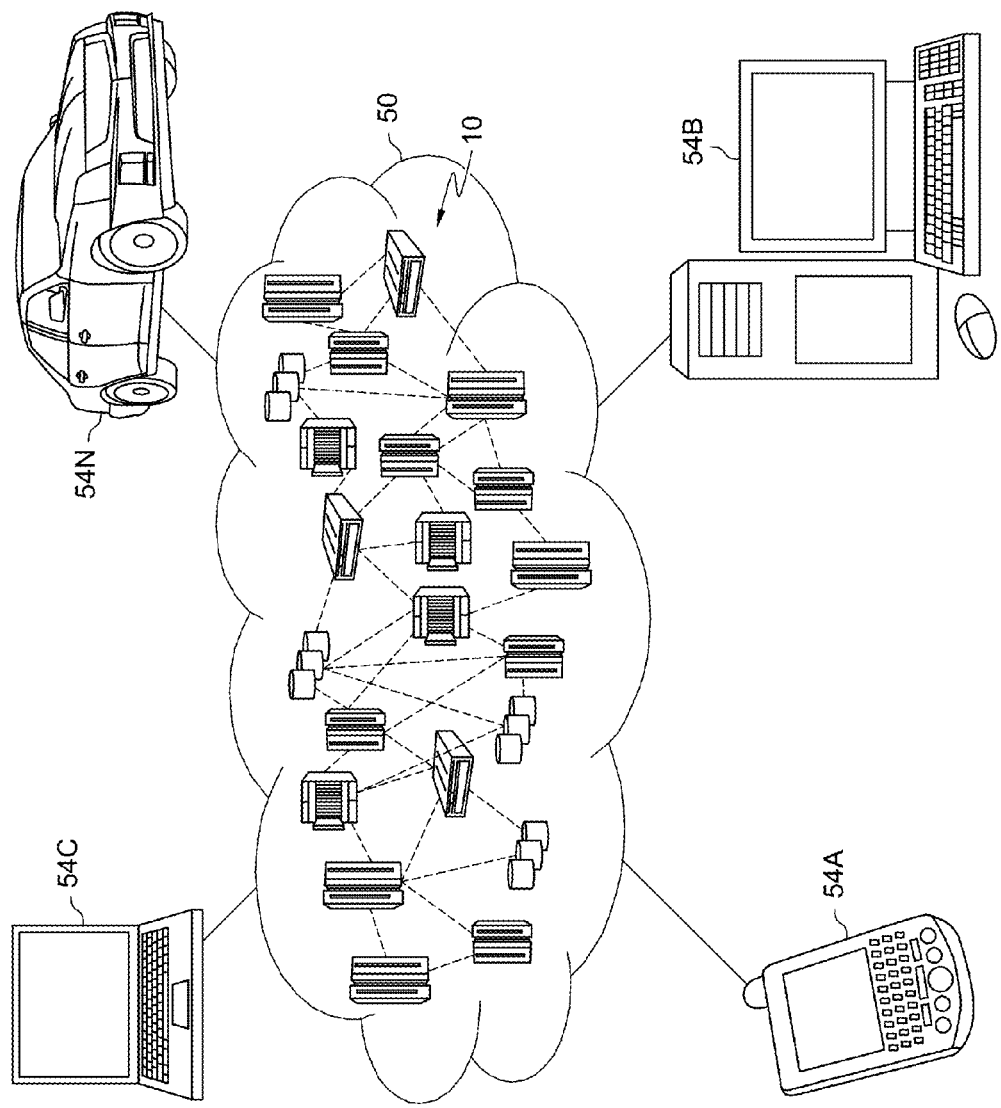
FIG. 8 depicts a cloud computing environment according to an embodiment of the present invention.

Referring now to FIG. 8, illustrative cloud computing environment 50 is depicted. As shown, cloud computing environment 50 comprises one or more (cloud) computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Methods for listing optimal VM instances in a computing environment based on user context may be performed in a cloud environment, e.g., in the virtualization layer 70.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing VM instance requests 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for listing optimal machine instances in a computing environment to address one or more received tasks based on user context, the method comprising:
   receiving a task request based on a first task to be performed within the computing environment, wherein the received task request comprises a request to resolve at least one problem associated with at least one application, wherein the first task comprises at least one project task to resolve the at least one problem and comprises metadata associated with the first task to identify the at least one problem, and wherein a description of the first task is received via the metadata and user input;
   based on the received task request, identifying one or more similar tasks from a plurality of other tasks comprising:
      comparing the metadata for the first task to a plurality of metadata for the plurality of other tasks based on a classification analysis, and
      selecting the identified one or more similar tasks based on the comparison, wherein similarity of the identified and selected one or more similar tasks to the first task is based on a result from the classification analysis exceeding a predetermined confidence level, and
      wherein the plurality of other tasks comprise previous tasks performed within the computing environment on corresponding previous machine instances that are associated with previous problems; and
   in response to identifying and selecting the one or more similar tasks, generating a list of one or more previous machine instances corresponding to the identified and selected one or more similar tasks, wherein the list of one or more previous machine instances is associated with instructions to commence the one or more previous machine instances, and wherein the one or more previous machine instances comprises at least one of a virtual machine (VM) instance or a physical machine instance, and wherein generating the list comprises ranking the one or more previous machine instances based on a priority ranking and information associated with the first task and the identified and selected one or more similar tasks, and listing the one or more previous machine instances based on the ranking.

2. The method according to claim 1, wherein the first task is associated with a first task category and a first customer name, and wherein ranking the one or more previous machine instances corresponding to the one or more similar tasks comprises assigning the priority ranking, wherein the priority ranking is selected from the group consisting of:

a highest rank priority to a machine instance corresponding to a previous task performed by the user within the computing environment;

a second highest rank priority to a machine instance corresponding to a similar task associated with the first task category and the first customer name;

a third highest rank priority to a machine instance corresponding to a similar task associated with the first task category; and a fourth highest rank priority to a machine instance corresponding to a similar task associated with the first customer name.

3. The method according to claim 2, wherein the highest rank priority is assigned to a machine instance corresponding a previous performance of the first task by the user within the computer environment.

4. The method according to claim 2, wherein the highest rank priority is assigned to a machine instance corresponding to a previous task most recently performed by the user within the computing environment.

5. The method according to claim 2, wherein a plurality of machine instances are assigned to a single priority ranking, and wherein the plurality of machine instances assigned to the single priority ranking are further ranked from a most recently used machine instance to a least recently used machine instance.

6. The method according to claim 1, wherein the classification analysis is performed by comprises at least one of natural language processing or machine-learning.

7. The method according to claim 6, wherein identifying the one or more similar tasks from the plurality of other tasks further comprises:

transmitting an application programming interface (API) call to an external computing system, wherein the API call comprises metadata associated with the first task, and wherein the external computing system performs at least one of natural language processing or machine-learning; and receiving results from the external computing system comprising metadata associated with one or more candidate tasks sorted in order of certainty that the one or more candidate tasks is equivalent to the first task.

8. The method according claim 1, further comprising providing a user interface for selecting a machine instance on which to perform the first task within the computing environment, and wherein the user interface comprises a dropdown menu, and wherein generating the list of one or more previous machine instances corresponding to the one or more similar tasks comprises displaying the list in the dropdown menu.

9. The method according to claim 8, wherein the user interface further comprises a user interface object associated with initiating instructions to commence a previous machine instance selected from the dropdown menu.

10. The method according to claim 9, wherein the dropdown menu further comprises an option to create a new machine instance, and the user interface object is further associated with initiating instructions to commence the new machine instance.

11. The method according to claim 1, wherein the metadata for the plurality of other tasks is stored in a database, and the method further comprises:

receiving instructions to commence a selected machine instance selected from the list of one or more previous machine instances; and storing updated metadata for the first task in the database, wherein the updated metadata includes metadata associated with the selected machine instance.

12. The method according to claim 10, wherein the metadata for the plurality of other tasks is stored in a database, and the method further comprises:

receiving instructions to commence the new machine instance; and storing updated metadata for the first task in the database, wherein the updated metadata includes metadata associated with the new machine instance.

13. The method according to claim 1, wherein the computing environment is a cloud computing environment.

14. A computer program product for listing optimal machine instances in a computing environment to address one or more received tasks based on user context, the computer program product comprising at least one computer readable non-transitory storage medium having computer readable program instructions thereon for execution by a processor, the computer readable program instructions comprising program instructions for:

receiving a task request based on a first task to be performed within the computing environment, wherein the received task request comprises a request to resolve at least one problem associated with at least one application, wherein the first task comprises at least one project task to resolve the at least one problem and comprises metadata associated with the first task to identify the at least one problem, and wherein a description of the first task is received via the metadata and user input;

based on the received task request, identifying one or more similar tasks from a plurality of other tasks comprising:

comparing the metadata for the first task to a plurality of metadata for the plurality of other tasks based on a classification analysis, and selecting the identified one or more similar tasks based on the comparison, wherein similarity of the identified and selected one or more similar tasks to the first task is based on a result from the classification analysis exceeding a predetermined confidence level, and wherein the plurality of other tasks comprise previous tasks performed within the computing environment on corresponding previous machine instances that are associated with previous problems; and in response to identifying and selecting the one or more similar tasks, generating a list of one or more previous machine instances corresponding to the identified and selected one or more similar tasks, wherein the list of one or more previous machine instances is associated with instructions to commence the one or more previous machine instances, and wherein the one or more previous machine instances comprises at least one of a virtual machine (VM) instance or a physical machine instance, and wherein generating the list comprises ranking the one or more previous machine instances based on a priority ranking and information associated with the first task and the identified and selected one or more similar tasks, and listing the one or more previous machine instances based on the ranking.

15. The computer program product according to claim 14, wherein the first task is associated with a first task category and a first customer name, and wherein ranking the one or more previous machine instances corresponding to the one or more similar tasks comprises assigning the priority ranking, wherein the priority ranking is selected from the group consisting of:
   a highest rank priority to a machine instance corresponding to a previous task performed by the user within the computing environment;
   a second highest rank priority to a machine instance corresponding to a similar task associated with the first task category and the first customer name;
   a third highest rank priority to a machine instance corresponding to a similar task associated with the first task category; and
   a fourth highest rank priority to a machine instance corresponding to a similar task associated with the first customer name.

16. A computer system for listing optimal machine instances in a computing environment to address one or more received tasks based on user context, the computer system comprising:
   at least one processing unit;
   at least one computer readable memory;
   at least one computer readable tangible, non-transitory storage medium; and
      program instructions stored on the at least one computer readable tangible, non-transitory storage medium for execution by the at least one processing unit via the at least one computer readable memory, wherein the program instructions comprise program instructions for:
   receiving a task request based on a first task to be performed within the computing environment, wherein the received task request comprises a request to resolve at least one problem associated with at least one application, wherein the first task comprises at least one project task to resolve the at least one problem and comprises metadata associated with the first task to identify the at least one problem, and wherein a description of the first task is received via the metadata and user input;
   based on the received task request, identifying one or more similar tasks from a plurality of other tasks comprising:
      comparing the metadata for the first task to a plurality of metadata for the plurality of other tasks based on a classification analysis, and
      selecting the identified one or more similar tasks based on the comparison, wherein similarity of the identified and selected one or more similar tasks to the first task is based on a result from the classification analysis exceeding a predetermined confidence level, and
      wherein the plurality of other tasks comprise previous tasks performed within the computing environment on corresponding previous machine instances that are associated with previous problems; and
   in response to identifying and selecting the one or more similar tasks, generating a list of one or more previous machine instances corresponding to the identified and selected one or more similar tasks, wherein the list of one or more previous machine instances is associated with instructions to commence the one or more previous machine instances, and wherein the one or more previous machine instances comprises at least one of a virtual machine (VM) instance or a physical machine instance, and wherein generating the list comprises ranking the one or more previous machine instances based on a priority ranking and information associated with the first task and the identified and selected one or more similar tasks, and listing the one or more previous machine instances based on the ranking.

17. The computer system according to claim 16, wherein the first task is associated with a first task category and a first customer name, and wherein ranking the one or more previous machine instances corresponding to the one or more similar tasks comprises assigning the priority ranking, wherein the priority ranking is selected from the group consisting of:
   a highest rank priority to a machine instance corresponding to a previous task performed by the user within the computing environment;
   a second highest rank priority to a machine instance corresponding to a similar task associated with the first task category and the first customer name;
   a third highest rank priority to a machine instance corresponding to a similar task associated with the first task category; and
   a fourth highest rank priority to a machine instance corresponding to a similar task associated with the first customer name.

\* \* \* \* \*